Jan. 23, 1940.  J. R. McGIFFERT  2,187,909
YARDER MOUNTING
Filed March 8, 1937  2 Sheets-Sheet 1
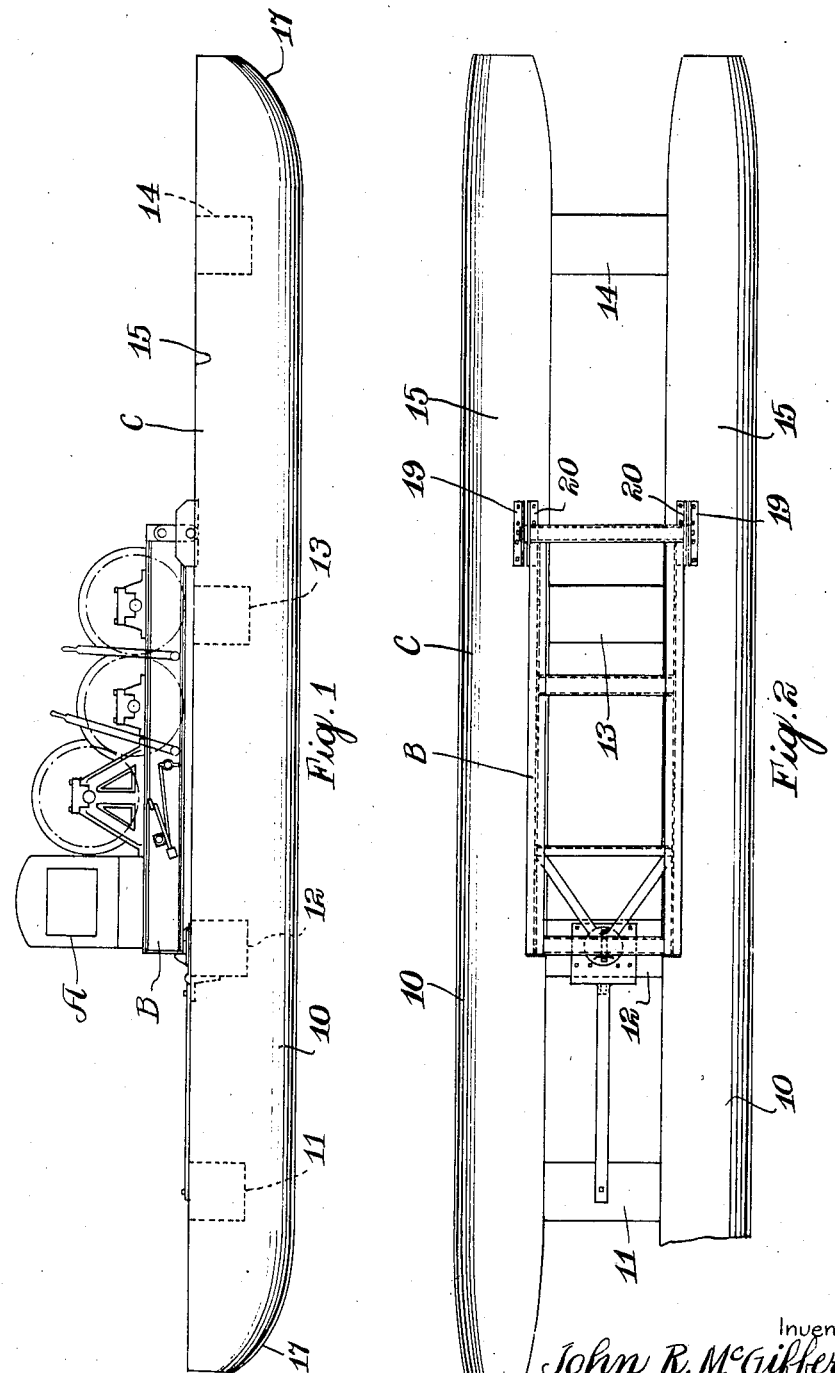
Inventor
John R. McGiffert
By Harry Pirelo
Attorney Jan. 23, 1940.   J. R. McGIFFERT   2,187,909
YARDER MOUNTING
Filed March 8, 1937   2 Sheets-Sheet 2

Inventor
John R. McGiffert
By Howard Fischer
Attorney

Patented Jan. 23, 1940

2,187,909

UNITED STATES PATENT OFFICE 2,187,909

YARDER MOUNTING

John R. McGiffert, Duluth, Minn., assignor to Clyde Iron Works, Inc., Duluth, Minn., a corporation of Maine Application March 8, 1937, Serial No. 129,659

3 Claims. (Cl. 248—6)

My invention relates to an improvement in yarder mountings wherein it is desired to provide a means of mounting the bed of a yarder, or the like, upon a sled or other vehicle in such a way that strain upon the sled will not be transmitted to the yarder.

It is common practice to mount logging machines of various types upon long sleds in order that they may be moved from one position to another. The runners used for these sleds are usually formed of logs several feet in diameter, and are often 50' or 60' in length. The runners are connected by cross-members and are braced to make them as strong as possible. The frame or bed of the logging machine is secured upon this sled and has in the past often been bolted directly to the sled. It has been found, however, that due to the tremendous strains exerted when the machine is being moved from one position to another some strain has been transmitted through the frame of the device providing a tendency to bind the shafts of the machine in their bearings.

As the logging machine is moved over uneven ground, one runner will oftentimes offer considerably more resistance than the other causing a tendency for one runner to be pulled ahead of the other. Furthermore, the obstructions over which the device is drawn oftentimes raises one runner above the other causing a tendency for the sled to distort to some extent.

It is the object of the present invention to provide a means of mounting the frame of a yarder or other logging machine, upon the sled in such a way that the tendency for distortion will not be transmitted to this frame. With such a construction much of the repair work ordinarily necessary both for the sled and for the logging machine may be avoided as slight racking or distortion of the sled will not in any way disturb the proper operation of the logging machine. Furthermore, the tendency for the binding of shafts in a yarder or other machine is obviated by my construction.

It is a purpose of my invention to secure one end of the yarder frame to each of the sled runners in such a way that relative longitudinal movement between these runners will not create any twisting strain in the frame. It is a further purpose of my invention to mount the opposite end of the frame upon a cross-arm centrally between the runners in such a way that relative twisting of the sled runners will not be transmitted to the yarder frame. By following this procedure, I am able to support the yarder from three points without creating any twisting tendency upon the frame itself.

It is my purpose to mount the yarder frame centrally at one end by means of a type of universal joint which will permit free pivoting of the frame with respect to the cross-member of the sled to which it is attached, and which will also permit relative rocking between the sled cross-member and the end of the frame. Such a mounting will readily relieve any strain which might be created by the raising of one runner above the other. This mounting in combination with the mounting on the opposite end of the frame which permits relative longitudinal movement between the runners permits free flexing of the sled with no damage to the yarder frame. It will be understood that any relative movement between the runners of the sled is extremely small due to the heavy bracing.

These and other objects and novel features of my invention will be more clearly and fully set forth in the following specification and claims.

In the drawings forming a part of my specification:

Figure 1 is a side elevation view of a yarder mounted upon a frame, which frame is secured to a heavy constructed sled.

Figure 2 is a top plan view of the yarder frame in position upon the sled.

Figure 3:
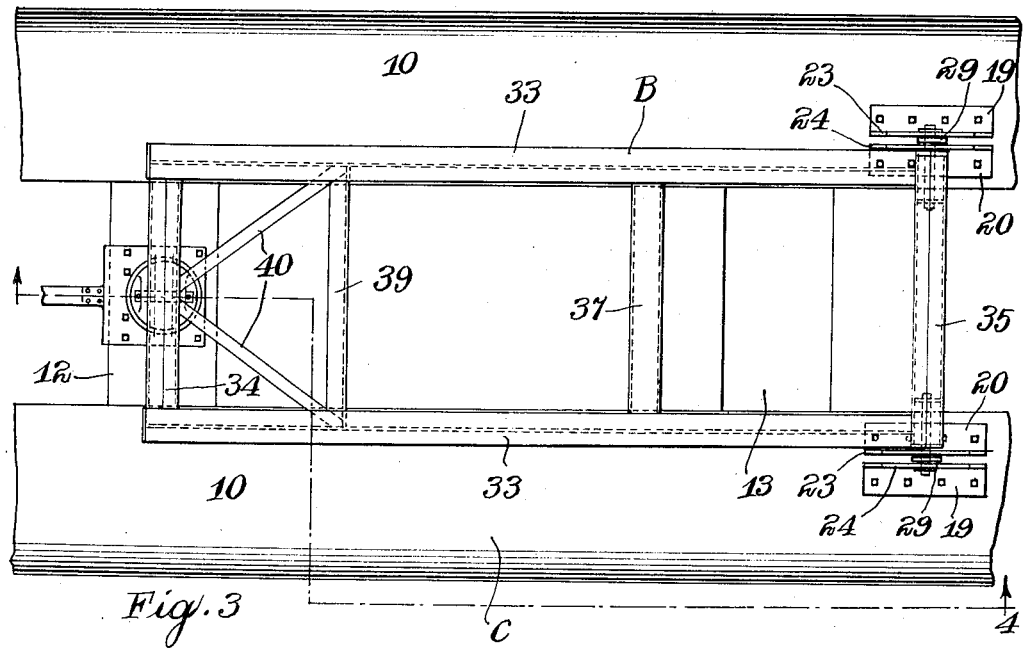
Figure 3 is an enlarged plan view of the yarder frame illustrating the construction of the mounting.

Referring to the drawings, the yarder A is mounted upon the frame B which in turn is secured to the sled C. The present invention resides particularly in the type of mounting used to connect the members B and C.

Figures 5, 6:
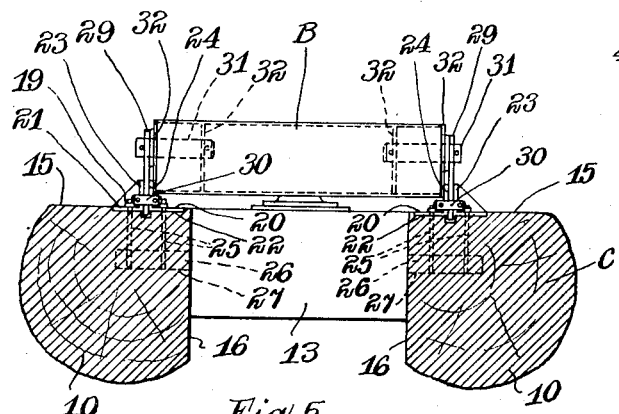
Figure 5 is a cross-sectional view of the yarder through my sled, illustrating an end view of the frame construction and mounting.
Figure 6 is a cross-sectional view through the rear mounting of my device.

The sled C comprises a pair of runners 10 which are parallel and which are connected at various points throughout the length thereof by cross-members 11, 12, 13 and 14. The runners 10 are ordinarily formed of logs which are hewn off along the upper surface 15 and the inner surface 16 thereof as best illustrated in Figure 5 of the drawings. The logs forming the runners 10 are ordinarily several feet in diameter and are rounded at the ends 17 to slide readily over the surface of the ground.

Figure 4:
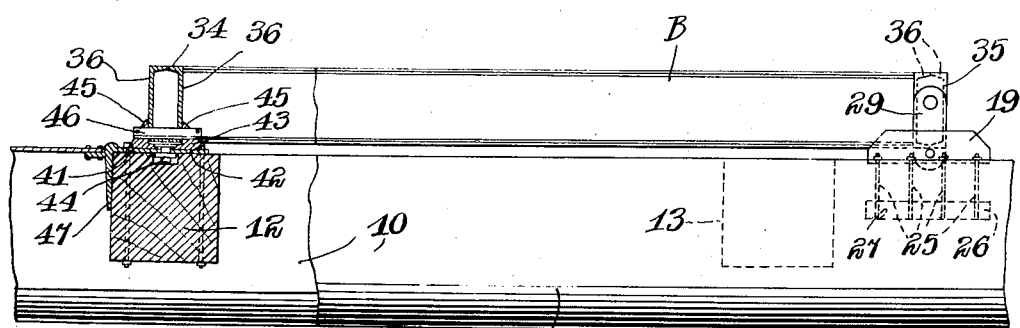
Figure 4 is a side elevation view partly in section, and taken along the line 4—4 of Figure 3.

Upon the upper surface 15 of each runner 10, I provide a pair of spaced angle members 19 and 20. These angle members 19 and 20 as illustrated in Figures 4 and 5 of the drawings, are countersunk into the runners 10 so that the upper surface of the flanges 21 and 22 respectively of the angles 19 and 20 are substantially flush with the upper surface 15 of the runners. The angles 19 and 20 also present upwardly extending flanges 23 and 24 respectively which extend upwardly from the surface 15 in spaced relationship. The flanges 21 and 22 are secured to the runners 10 by means of studs 25 which are threaded into a bearing block 26 positioned in a slot 27 in the runners 10 provided for this purpose. The studs 25 extend through the flanges 21 and 22 and are held in place by nuts threaded on to the studs 25.

Interposed between the upwardly extending flanges 23 and 24 on each runner 10, I provide a link 29 which is pivotally mounted on a pin 30 extending through the flanges 23 and 24. This link 29 is pivotally connected to the frame B by means of a pivot pin 31 which extends through spaced partition walls 32 in the frame B.

The frame B comprises a pair of parallel I-beams 33 having end beams 34 and 35 connecting the same. The beams 34 and 35 comprise a pair of channel members 36 welded together to form a hollow beam. The partition members 32 are positioned one at each end of the beam 35 and the other spaced a short distance therefrom to provide a bearing for the pin 31 on each end of the beam 35. Bracing beams 37, 39 and 40 connect the opposed sides 33 of the frame B and reinforce the same.

The beam 34 of the frame B is connected centrally to the center of the cross-member 12 connecting the runners 10. The connection between the beam 34 and the cross-member 10 comprises a plate 41 which overlies the central portion of the member 12 and which is provided with an upstanding circular ring 42 on the upper surface thereof. A disk 43 is rotatably secured within the ring 42 and is connected centrally to the plate 41 by means of a bolt 44. This disk 43 is accordingly free to rotate upon the plate 41.

The disk 43 is equipped with a pair of upwardly extending ears 45 which are designed to extend on either side of the beam 34 of the frame B. A pivot pin 46 extends through the ears 45 and through the beam 34 in a manner to pivotally connect the beam 34 to the disk 43. In order to reinforce the plate 41 and to provide ample bearing of this plate upon the cross-member 12, I provide a flange 47 which extends over the edge of the cross-girt or member 12. This flange 47 is of sufficient size to be of material assistance in withstanding forward stresses exerted upon the frame B.

As will now be clearly understood the frame B is supported at one end entirely by means of links 29. This end of the frame B is held from side movement by the engagement of the frame B against the upstanding flanges 24 of the angle members 20. Figure 1 of the drawings shows the yarder A connected on the frame in such a way that the winding drums are more closely positioned to the end of the frame B supported by the links 29. While this is not essential to my invention, it will be understood that the lines from the winding drums often extend through pulley blocks mounted upon masts high in the air, and the links 29 pull upwardly upon the sled C. When one runner 10 moves slightly in advance of the other during movement of the sled, the links 29 pivot slightly to prevent any strain upon the frame B. The frame B is held from longitudinal movement with respect to the sled 10, entirely by the connection between the beam 34 and the cross-member 12. Any angularity of the cross-girt 12 caused by the movement of one runner 10 ahead of the other, merely tends to rotate the disk 43 with respect to the plate 41. Any tendency for one runner to raise above the other merely pivots the beam 34 upon the pivot pin 46. The frame B is, therefore, supported in such a way that twisting in either direction cannot be transmitted to the frame B. All danger of causing the shafts of the yarder to bind is in this way eliminated.

In accordance with the patent statutes, I have described the principles of construction and operation of my yarder mounting and while I have endeavored to disclose the preferred construction thereof, I desire to have it understood that this is only illustrative of a means of carrying out my invention and that obvious changes may be made within the scope of the following claims without departing from the spirit of my invention.

I claim:

1. A frame mounting in combination with a substantially horizontal elongated frame, comprising a pair of oppositely disposed substantially vertical links, pivotal connecting means connecting one end of said frame to said links, a base upon which said frame is to be mounted, means for pivotally connecting said links to said base, the pivots extending transversely of said frame and base, and a universal joint connecting the opposite end of said frame to said base.

2. A frame mounting for sleds having parallel runners with cross-members therebetween, including a plate overlying one of said cross-members, a rotatable member pivotally supported on said plate, pivot means pivotally connecting said rotatable member to one end of said frame, and substantially vertically extending link means pivoted along pivots extending transversely to said runners at one end to said frame and at the other end to one of said runners connecting said frame to each of said runners.

3. A frame mounting for connecting a frame to a sled having a pair of spaced runners and cross-members connecting the runners, including a vertically extending member on each of said runners engageable with one end of said frame to prevent lateral movement of said frame with respect to said runners, a pair of links connecting said vertically extending members to said frame, and universal joint means secured centrally to a cross-member on said sled and centrally to the other end of said frame for universally connecting said sled to said other end of said frame.

JOHN R. McGIFFERT.